(12) United States Patent
Wilson (10) Patent No.: US 12,033,111 B2
(45) Date of Patent: Jul. 9, 2024

(54) DISTRIBUTION ITEM DELIVERY POINT MANAGEMENT SYSTEM (71) Applicant: United States Postal Service, Washington, DC (US)

(72) Inventor: James Deforrest Wilson, Collierville, TN (US)

(73) Assignee: United States Postal Service, Washington, DC (US)

(*) Notice: Subject to any disclaimer, the term of this patent is extended or adjusted under 35 U.S.C. 154(b) by 461 days.

(21) Appl. No.: 17/062,396

(22) Filed: Oct. 2, 2020

(65) Prior Publication Data

US 2021/0103890 A1    Apr. 8, 2021

Related U.S. Application Data (60) Provisional application No. 62/910,007, filed on Oct. 3, 2019.

(51) Int. Cl.
*G06Q 10/083*   (2024.01)
*G06F 16/953*   (2019.01)
*G06Q 10/0631*  (2023.01)
*G06Q 10/0833*  (2023.01)
*G06Q 10/0835*  (2023.01)
*G06Q 10/087*   (2023.01)

(52) U.S. Cl.
CPC ....... *G06Q 10/0838* (2013.01); *G06F 16/953* (2019.01); *G06Q 10/06315* (2013.01); *G06Q 10/083* (2013.01); *G06Q 10/0833* (2013.01); *G06Q 10/08355* (2013.01); *G06Q 10/087* (2013.01); *G06Q 2250/50* (2013.01)

(58) Field of Classification Search
CPC ......... G06Q 10/0838; G06Q 10/06315; G06Q 10/083; G06Q 10/0833; G06Q 10/08355; G06Q 10/087; G06Q 2250/50; G06F 16/953

See application file for complete search history.

(56) References Cited

U.S. PATENT DOCUMENTS

| | | |
|---|---|---|
| 5,363,971 A | 11/1994 | Weeks et al. |
| 5,586,036 A | 12/1996 | Pintsov |
| 5,682,429 A | 10/1997 | Cordery et al. |
| 6,173,274 B1 | 1/2001 | Ryan, Jr. |
| 6,178,411 B1 | 1/2001 | Reiter |
| 6,826,548 B2 * | 11/2004 | Hungerpiller ........ G06Q 10/107 705/401 |
| 6,959,292 B1 | 10/2005 | Pintsov |
| 7,190,474 B1 | 3/2007 | Silverbrook et al. |

(Continued)

OTHER PUBLICATIONS

Tarun Jain, Supplier's Obligation to Verify Recipient's Address: Reflections from the European Court of Justice, 2018, pp. j21-j23 (Year: 2018).*

(Continued)

*Primary Examiner* — Ibrahim N El-Bathy
(74) *Attorney, Agent, or Firm* — Knobbe Martens Olson & Bear, LLP (57) ABSTRACT

Systems and methods of managing incorrectly addressed items in a distribution network. A user can identify via an interface items which are incorrectly labelled, addressed, or which identify an incorrect recipient. The distribution network can use information from the user to reprocess items, reroute items, or take other actions.

10 Claims, 4 Drawing Sheets

(56) References Cited

U.S. PATENT DOCUMENTS

| | | | |
|---|---|---|---|
| 7,258,277 B2 | 8/2007 | Baker et al. |
| 7,571,211 B1 | 8/2009 | Melick et al. |
| 7,693,942 B2 | 4/2010 | Nale |
| 7,827,056 B2 | 11/2010 | Walker et al. |
| 7,827,057 B1 | 11/2010 | Walker et al. |
| 8,041,711 B2 | 10/2011 | Walker et al. |
| 8,190,496 B2 | 5/2012 | Rodriguez et al. |
| 8,526,743 B1 | 9/2013 | Campbell et al. |
| 8,598,482 B2 | 12/2013 | Bonnell et al. |
| 8,619,955 B2 | 12/2013 | Gopalakrishnan et al. |
| 8,666,806 B2 | 3/2014 | Rojas et al. |
| 8,973,066 B2 | 3/2015 | Hilson et al. |
| 9,105,016 B2 | 8/2015 | Briggman et al. |
| 9,159,071 B2 | 10/2015 | Gordon |
| 10,354,216 B2 | 7/2019 | Gillen et al. |
| 10,387,824 B2 | 8/2019 | Gillen et al. |
| 10,417,669 B2 | 9/2019 | Ho |
| 10,510,084 B2 | 12/2019 | Dearing et al. |
| 10,607,179 B1* | 3/2020 | Lee .................... G06Q 10/0838 |
| 10,693,819 B1 | 6/2020 | Boyd et al. |
| 11,499,835 B1* | 11/2022 | Lauka .................... G01C 21/34 |
| 2002/0032602 A1 | 3/2002 | Kenneth, Jr. et al. |
| 2002/0082923 A1 | 6/2002 | Merriman et al. |
| 2002/0095306 A1 | 7/2002 | Smith et al. |
| 2002/0143880 A1* | 10/2002 | Sansone ................ H04L 51/066 |
| | | | 709/206 |
| 2003/0074411 A1 | 4/2003 | Nale |
| 2003/0169900 A1 | 9/2003 | Woolston et al. |
| 2004/0178128 A1 | 9/2004 | O'Connell et al. |
| 2004/0181462 A1 | 9/2004 | Bauer et al. |
| 2005/0174592 A1 | 8/2005 | Iinuma et al. |
| 2005/0175215 A1 | 8/2005 | Machida |
| 2005/0204381 A1 | 9/2005 | Ludvig et al. |
| 2005/0222903 A1 | 10/2005 | Buchheit et al. |
| 2005/0278142 A1 | 12/2005 | Beckert et al. |
| 2006/0229895 A1* | 10/2006 | Kodger .................. G06Q 10/08 |
| | | | 705/333 |
| 2006/0230004 A1 | 10/2006 | Handley |
| 2006/0253405 A1 | 11/2006 | Nirenberg |
| 2007/0007341 A1 | 1/2007 | Poulin et al. |
| 2007/0088749 A1 | 4/2007 | Lorch et al. |
| 2007/0156422 A1 | 7/2007 | Foth et al. |
| 2007/0156423 A1 | 7/2007 | Foth et al. |
| 2007/0216960 A1 | 9/2007 | Ohtani |
| 2008/0019562 A1 | 1/2008 | Makishima et al. |
| 2008/0065490 A1 | 3/2008 | Novick et al. |
| 2008/0071558 A1 | 3/2008 | Crutchfield |
| 2008/0104191 A1 | 5/2008 | Agrawal et al. |
| 2008/0154751 A1 | 6/2008 | Miles |
| 2008/0158615 A1 | 7/2008 | Parkos et al. |
| 2008/0246990 A1* | 10/2008 | Brockhurst ........... G06F 3/1253 |
| | | | 358/1.15 |
| 2009/0051108 A1 | 2/2009 | Bell |
| 2009/0157733 A1 | 6/2009 | Kim et al. |
| 2009/0187939 A1 | 7/2009 | Lajoie |
| 2009/0190192 A1 | 7/2009 | Kohara |
| 2009/0213405 A1 | 8/2009 | Eguchi et al. |
| 2009/0228380 A1 | 9/2009 | Evanitsky |
| 2009/0313194 A1 | 12/2009 | Amar et al. |
| 2010/0049536 A1 | 2/2010 | Quine et al. |
| 2010/0100233 A1 | 4/2010 | Lu |
| 2010/0153252 A1 | 6/2010 | Begen |
| 2010/0161424 A1 | 6/2010 | Sylvain |
| 2010/0228595 A1 | 9/2010 | Dempster et al. |
| 2010/0230328 A1 | 9/2010 | Bonnell et al. |
| 2010/0287282 A1 | 11/2010 | MacLaughlin |
| 2011/0066692 A1 | 3/2011 | Ciancio-Bunch et al. |
| 2011/0071894 A1 | 3/2011 | Nesamoney et al. |
| 2011/0093347 A1 | 4/2011 | Lindblom et al. |
| 2011/0145329 A1 | 6/2011 | Fukasawa |
| 2011/0173114 A1 | 7/2011 | Annunziata |
| 2011/0258039 A1 | 10/2011 | Patwa et al. |
| 2011/0264530 A1 | 10/2011 | Santangelo et al. |
| 2011/0302025 A1 | 12/2011 | Hsiao et al. |
| 2012/0042025 A1 | 2/2012 | Jamison et al. |
| 2012/0054143 A1 | 3/2012 | Doig et al. |
| 2012/0054189 A1 | 3/2012 | Moonka et al. |
| 2012/0059714 A1 | 3/2012 | Furman et al. |
| 2012/0072280 A1 | 3/2012 | Lin |
| 2012/0182588 A1 | 7/2012 | Mampe et al. |
| 2013/0035985 A1 | 2/2013 | Gilbert |
| 2013/0041961 A1 | 2/2013 | Thrower, III et al. |
| 2013/0054371 A1 | 2/2013 | Mason et al. |
| 2013/0198300 A1 | 8/2013 | Briggman et al. |
| 2013/0212034 A1 | 8/2013 | Briggman et al. |
| 2013/0254815 A1 | 9/2013 | Pfeffer et al. |
| 2014/0105452 A1 | 4/2014 | Bowne et al. |
| 2014/0123176 A1 | 5/2014 | Cooper |
| 2014/0136632 A1 | 5/2014 | Rauh et al. |
| 2014/0140571 A1 | 5/2014 | Elmenhurst et al. |
| 2014/0200972 A1 | 7/2014 | Jeremias |
| 2014/0278851 A1 | 9/2014 | Kopanati |
| 2014/0316902 A1 | 10/2014 | Le Jouan et al. |
| 2014/0333958 A1 | 11/2014 | Oshima |
| 2014/0351163 A1 | 11/2014 | Tussy |
| 2014/0374478 A1 | 12/2014 | Dearing et al. |
| 2015/0039528 A1 | 2/2015 | Minogue et al. |
| 2015/0149274 A1 | 5/2015 | Conrad |
| 2016/0224938 A1* | 8/2016 | Shah .................... G06Q 10/083 |
| 2017/0024767 A1 | 1/2017 | Johnson, Jr. et al. |
| 2017/0147588 A1 | 5/2017 | Maller et al. |
| 2017/0195268 A1 | 7/2017 | Nair |
| 2018/0089526 A1 | 3/2018 | Walsh |
| 2018/0089623 A1 | 3/2018 | Walsh |
| 2018/0121873 A1 | 5/2018 | Walsh |
| 2018/0165715 A1 | 6/2018 | Pingry et al. |
| 2018/0189831 A1 | 7/2018 | Appel et al. |
| 2018/0253687 A1 | 9/2018 | Bornitz et al. |
| 2019/0122174 A1* | 4/2019 | Gil ........................ G06V 20/64 |
| 2019/0132458 A1 | 5/2019 | Okuno |
| 2019/0188544 A1* | 6/2019 | Cousins ............... G06V 30/414 |
| 2021/0117573 A1 | 4/2021 | Lewbel et al. |
| 2021/0224766 A1 | 7/2021 | Kuncl et al. |

OTHER PUBLICATIONS

International Search Report and Written Opinion dated Apr. 27, 2018 in International Application No. PCT/US2018/020975.

International Preliminary Report on Patentability dated Sep. 19, 2019 in International Application No. PCT/US2018/020975.

Balaji, "Destination Address Interpretation for Automating the Sorting Process of Indian Postal System", published by IEEE, 2003.

Yuan, Haidong, "Image-based Stamp Extraction for Enhanced Postal Automation", published by IEEE, 2008.

* cited by examiner

DISTRIBUTION ITEM DELIVERY POINT MANAGEMENT SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority to U.S. Provisional Application No. 62/910,007, filed Oct. 3, 2019, the entire contents of which are hereby incorporated in their entirety.

BACKGROUND

The current disclosure relates to improving operations of a distribution network by identifying items that have incorrect recipients or are sent to an incorrect delivery point and automatically routing or re-routing items accordingly.

In one aspect described herein, a method for processing items in distribution network, the method comprises: providing, via a user interface, item information to a user, the item information comprising an intended recipient name and a delivery point; receiving, via the user interface, input from the user regarding the provided item information, the input comprising an indication that the item recipient is not associated with the delivery point; determining, in a server, a correct delivery point based on the intended recipient; updating, in a memory, the item information with the correct delivery point; receiving, in item processing equipment, an item associated with the item information; and processing the item according to the updated item information.

In some embodiments, the item information comprises a photograph of a physical item showing the intended recipient name and the delivery point.

In some embodiments, the item received in the item processing equipment is the physical item, the photograph of which was provided to the user.

In some embodiments, determining the correct delivery point comprises querying a database for previously delivered items having the intended recipient's name associated therewith.

In some embodiments, determining the correct delivery point further comprises identifying the sender of the item or a type of the item and querying the database for an association between the previously delivered items and the intended recipient's name.

In some embodiments, processing the item according to the updated item information comprises: identifying, in an item visibility system, a current location of the physical item; identifying, in the server, a next piece of item processing equipment based on the identified current location of the physical item; sending, via the server, instructions to the identified next piece of item processing equipment to process the item according to the updated information.

In some embodiments, the identified next piece of item processing equipment is a sorting apparatus, and wherein the instructions comprise identifying a new sort destination in the sorting apparatus for the new item.

In some embodiments, the identified next piece of item processing equipment is a mobile delivery device, and wherein the instructions comprise a notification to a carrier to transport the item to a delivery facility.

In some embodiments, if a correct delivery point cannot be identified, the process further comprises: updating the item record to indicate that no delivery point is identified; instructing the item processing equipment that no delivery point is identified; and moving, in the item processing equipment, the physical item to a holding location.

In another aspect described herein, a system for processing items in distribution network, the system comprises a user interface, the user interface configured to: provide item information to a user, the item information comprising an intended recipient name and a delivery point; and receive input from the user regarding the provided item information, the input comprising an indication that the item recipient is not associated with the delivery point; a server configured to: determine a correct delivery point based on the received input and on the intended recipient; and update, in a memory, the item information with the correct delivery point; and item processing equipment configured to: receive the physical item an item associated with the item information; receive, from the server, the updated item information; and process the item according to the updated item information.

In some embodiments, the item information comprises a photograph of a physical item showing the intended recipient name and the delivery point.

In some embodiments, the item received in the item processing equipment is the physical item, the photograph of which was provided to the user.

In some embodiments, the server is further configured to determine the correct delivery point by querying a database for previously delivered items having the intended recipient's name associated therewith.

In some embodiments, the server is further configured to determine the correct delivery point by identifying the sender of the item or a type of the item and querying the database for an association between the previously delivered items and the intended recipient's name.

In some embodiments, the server is further configured to process the item according to the updated item information by identifying, in an item visibility system, a current location of the physical item; identifying, in the server, a next piece of item processing equipment based on the identified current location of the physical item; sending, via the server, instructions to the identified next piece of item processing equipment to process the item according to the updated information.

In some embodiments, the identified next piece of item processing equipment is a sorting apparatus, and wherein the instructions comprise identifying a new sort destination in the sorting apparatus for the new item.

In some embodiments, the identified next piece of item processing equipment is a mobile delivery device, and wherein the instructions comprise a notification to a carrier to transport the item to a delivery facility.

In some embodiments, if a correct delivery point cannot be identified, the process is further configured to: update the item record to indicate that no delivery point is identified; instruct the item processing equipment that no delivery point is identified; and wherein the item processing equipment is further configured to move, in the item processing equipment, the physical item to a holding location.

In another aspect, a method for processing items in distribution network, the method comprises providing, via a user interface, item information to a user, the item information comprising an intended recipient name and a delivery point; receiving, via the user interface, input from the user regarding the provided item information, the input comprising an updated delivery point; updating, in a memory, the item information with the correct delivery point; identifying, in an item visibility system, a current location of a physical item having the item information thereon; identifying, in the server, a next piece of item processing equipment based on the identified current location of the physical item; sending, via the server, instructions to the identified next piece of item processing equipment to process the item according to the updated information; receiving, in the item processing equipment, the physical item; and sorting, in the item processing equipment, the item according to the updated item information.

In some embodiments, the input from the user comprises a request to deliver the physical item to an alternate delivery location.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with the additional specificity and detail through use of the accompanying drawings.

DETAILED DESCRIPTION

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

The present disclosure relates to systems and methods for determining and managing delivery points in a distribution network such as the United States Postal Service (USPS). This can include allowing recipients to identify and inform the distribution network of incorrect addressees, incorrect delivery points, and the like via a user interface.

A distribution network may comprise multiple levels. For example, a distribution network may comprise regional distribution facilities, hubs, and unit delivery facilities, or any other desired level. A nationwide distribution network, for example, may comprise one or more regional distribution facilities having a defined coverage area (such as a geographic area), designated to receive items from intake facilities within the defined coverage area, or from other regional distribution facilities. The regional distribution facility can sort items for delivery to another regional distribution facility, or to a hub level facility within the regional distributional facility's coverage area. A regional distribution facility can have one or more hub level facilities within its defined coverage area. A hub level facility can be affiliated with a few or many unit delivery facilities, and can sort and deliver items to the unit delivery facilities with which it is associated. In the case of the USPS, the unit delivery facility (or delivery unit) may be associated with a ZIP Code. The unit delivery facility receives items from local senders, and from hub level facilities or regional distribution facilities. The unit delivery facility also sorts and stages the items intended for delivery to destinations within the unit delivery facility's coverage area.

As used herein, the term item may refer to an individual article, object, agglomeration of articles, or container having more than one article within, in a distribution system. An item may be a letter, magazine, flat, luggage, package, box, or any other item of inventory which is transported or delivered in a distribution system or network. The term item may also refer to a unit or object which is configured to hold one or more individual items, such as a container which holds multiple letters, magazines, boxes, etc. The term item may also include any object, container, storage area, rack, tray, truck, train car, airplane, or other similar device into which items or articles may be inserted and subsequently transported, as are commonly used in distribution systems and networks.

Some embodiments of the present disclosure include using a user interface, such the Informed Delivery® system provided by the United States Postal Service, which sends images of and information relating to items intended for delivery to a delivery point to a recipient via an electronic communication system, such as email, a mobile computer application, and the like. A user can register for a system to receive alerts, updates, tracking information, and images of items that are to be delivered to a delivery point. The distribution network can associate a user with a delivery point in a user account. The distribution network can send the alerts, images, tracking information, etc., to the user associated with the delivery point in the system. The information can be sent to the user daily, every other day, weekly, or at any desired periodicity. The information for items can be sent in advance of the actual delivery of the items. For example, the system can send images of items that are to be delivered to the delivery point the same day, one day in advance, two days in advance, or any other desired time.

A user may get notifications, alerts, and/or sees an image of an item intended for delivery to the delivery point, but which has the name of a recipient who does not live, reside, work, or receive items at the delivery point to which the item is intended for delivery. This could occur when a user moves from one location to another and does not update the distribution network regarding the new location, such as by filing a change of address (COA) form. This could also occur if the item is misaddressed, or if an entity, such as a business or other entity, has old or outdated information for the identity of the residents and the delivery point.

If this occurs, the user can identify in the user interface that the item has an incorrect recipient, or that a delivery point is wrong. The user interface can also include selections for updating information, such as indicating that a recipient moved, that the actual recipient lives at another address, etc., which the user can optionally select. As used herein, the Informed Delivery® system can be a visibility system offering visibility of items as they move through the distribution network, and is exemplary only. Other systems and interfaces can be used and have the functionality described herein without departing from the scope of the disclosure.

When the user provides this information via the user interface, the distribution network systems can flag that an existing association between a recipient and a delivery point is incorrect, likely incorrect, disputed, etc. For example, a user may see an image of an item to be delivered, and can indicate that the recipient name is wrong, or that the recipient does not live at the address. The distribution network can provide this information to a sender of the item, indicating that the recipient and delivery point association is incorrect and needs to be updated. The distribution network and/or the item sender can access an address database to identify whether the recipient submitted a delivery point change, such as a change of address notice, in order to determine how to update the recipient's association with a delivery point. In response to user information that the resident or addresses is incorrect for a delivery point, the system can automatically reroute the item to a correct address, to a location where the item awaits further instruction. If the user provides input regarding the incorrect resident on an item before the item has been loaded onto a vehicle for delivery, or if there is another sorting operation to occur, the system can update an item record for the item and instruct the sorting equipment to re-route or re-sort the item. In some embodiments, the system can look for a COA form, or can query other sources to determine the correct destination.

Figure 1:
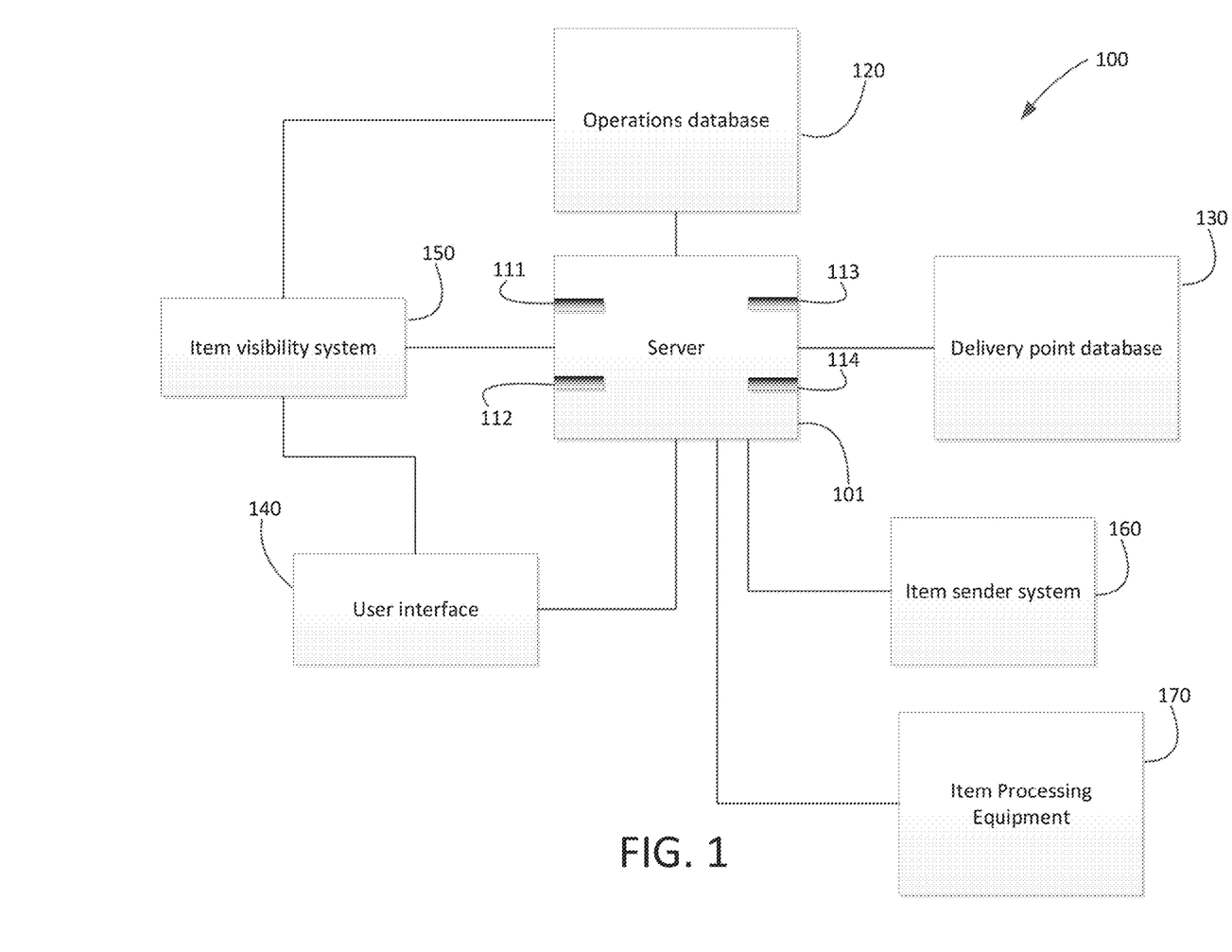
FIG. 1 is a block diagram of an exemplary system for managing distribution network operation.

FIG. 1 is a block diagram depicting an embodiment of system for managing distribution network operations. A system 100 comprises a server 101, an operations database 120, a delivery point database 130, and an item visibility system 150. The server 101 is in communication, either wired or wirelessly, with at least the operations database 120, the delivery point database 130, the item visibility system 150, an item sender system 160, and with item processing equipment 170.

The server 101 may comprise or be a component of a processing system implemented with one or more processors. The server 101 may be a network of interconnected processors housed on one or more terminals. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The server 101 may comprise a processor 111 such as, for example, a microprocessor, such as a Pentium® processor, a Pentium® Pro processor, a 8051 processor, a MIPS® processor, a Power PC® processor, an Alpha® processor, a microcontroller, an Intel CORE i7®, i5®, or i3® processor, an AMD Phenom®, A-series®, or FX® processor, or the like. The processor 111 typically has conventional address lines, conventional data lines, and one or more conventional control lines. The processor 111 may be in communication with a processor memory 112, which may include, for example, RAM memory, flash memory, ROM memory, EPROM memory, EEPROM memory, registers, hard disk, a removable disk, a CD-ROM, or any other form of storage medium known in the art. The processor memory 112 may include, for example, software, at least one software module, instructions, steps of an algorithm, or any other information. In some embodiments, the processor 111 performs processes in accordance with instructions stored in the processor memory 112. These processes may include, for example, controlling features and/or components of the expected delivery window generation system 100, and controlling access to and from, and transmitting information and data to and from the server 101 and the constituent components of the expected delivery window generation system 100, as will be described herein.

The server 101 comprises a system memory 113, configured to store information, for use in the server 101 operation. Information used or generated by the server 101 can be stored in the memory 113, and/or can be stored in one of the various systems or databases with which the server 101 is in communication. The system memory 113 may comprise a database, a comma delimited file, a text file, or the like. The server 101 is configured to coordinate and direct the activities of the components of the system 100, and to coordinate directions, notifications, and other processes associated with the distribution of items.

In some embodiments, the processor 111 is connected to a communication feature 114. The communication feature 114 is configured for wired and/or wireless communication. In some embodiments, the communication feature 114 communicates via telephone, cable, fiber-optic, or any other wired communication network. In some embodiments, the communication feature 114 may communicate via cellular networks, WLAN networks, or any other wireless network. The communication feature 114 is configured to receive instructions and to transmit and receive information among components of the system 100, and in some embodiments, with resources outside the system 100, as desired.

The server 101 is in communication the operations database 120. A database, as described herein, can be a memory, can have instructions for using and manipulating data, can be part of a related system to which the database is attached, and can comprise one or more processors or other components. The operations database 120 can comprise a processor, memory, databases, address and control lines, and other components similar to those described herein for the server 101. In other embodiments, the operations database 120 may be configured to use the processor, memory, databases, address and control lines, and other components of the server 101, or a combination of its own components and the server 101's components. In some embodiments, the operations database 120 can be hosted on a server (not shown) external to system 100. The operations database can store operational information for the distribution network, for a distribution network facility, for item processing equipment such as mail processing equipment, and the like. The operations database 120 can store or access images of items taken by item processing equipment as items are processed in the distribution network.

The server 101 is in communication with the delivery point database 130. In some embodiments, the delivery point database 130 may comprise a processor, memory, databases, address and control lines, and other components similar to those described herein for the server 101. In other embodiments, the delivery point database 130 may be configured to use the processor, memory, databases, address and control lines, and other components of the server 101, or a combination of its own components and the server 101's components. In some embodiments, the delivery point database 130 can be hosted on a server (not shown) external to system 100. The delivery point database 130 can store information regarding delivery points in the distribution network and can store associations between the delivery points and recipients at the delivery points.

In some embodiments, the delivery point database 130 can receive, store, manipulate, update and process information related to delivery points within the distribution network. Each delivery point in the distribution network can have an address and a recipient associated therewith. The recipient associated with a particular delivery point can change over time. The delivery points, addresses, and associated recipients can be in the delivery point database, which can be updated as needed.

The server 101 is in communication with user interface 140. In some embodiments, the user interface 140 can include a mobile application, a website, APIs, user terminals, and the like. The user interface 140 allows a user to access information regarding items delivered to or which are intended for delivery to a delivery point. A recipient associated with a delivery point can access information regarding items intended for delivery to the delivery point. The user interface 140 can be embodied in a hardware processor or can be implemented with a software solution to which a recipient has access. The user interface 140 is in communication with the item visibility system 150, and can also provide a user access to the information from the item visibility system 150.

The item visibility system 150 is in communication with the operations database 120, and can be in communication with other resources external to the system 100. The item visibility system 150 can include processors, memory, control lines, communication features, network connections, and other resources external to the system. The item visibility system 150 can identify items which are intended for delivery to each delivery point for a given time frame, such as a day, a week, and the like. The item visibility system 150 can store a location and/or tracking information for each item within the distribution network, or can access location information for items. The item visibility system 150 can also provide images of items and related information to a user via the user interface 140.

The server 101 is also in communication with an item sender system 160. The item sender system can include processors, memory, control lines, and other resources external to the system 100. The item sender system 160 can be maintained by a sender of items, such as by a sender that utilizes the distribution network to move items to intended destinations. The item sender system 160 can include a database or memory storing recipient information held by a specific sender or group of senders. For example, a merchant or other entity can have a recipient list, such as a mailing list of people and addresses to which the merchant sends items. The merchant may wish to have the recipient database updated as the system 100 receives updated recipient information. The server 101 can update the item sender system 160 as appropriate and according to an agreement between the distribution network and the item sender.

The server 101 is in communication with item processing equipment 170. The item processing equipment 170 can be a sorting machine, a mobile delivery device, an inventory control system, a storage system, a facing/cancelling apparatus, transportation device, automated guided vehicle, or any other machine or apparatus used in a distribution network. The server 101 can provide commands to the item processing equipment 170 to change sorting plans, sorting destinations, spray new information on items, etc., in response to, for example, input from users via the user interface 140.

Figure 2:
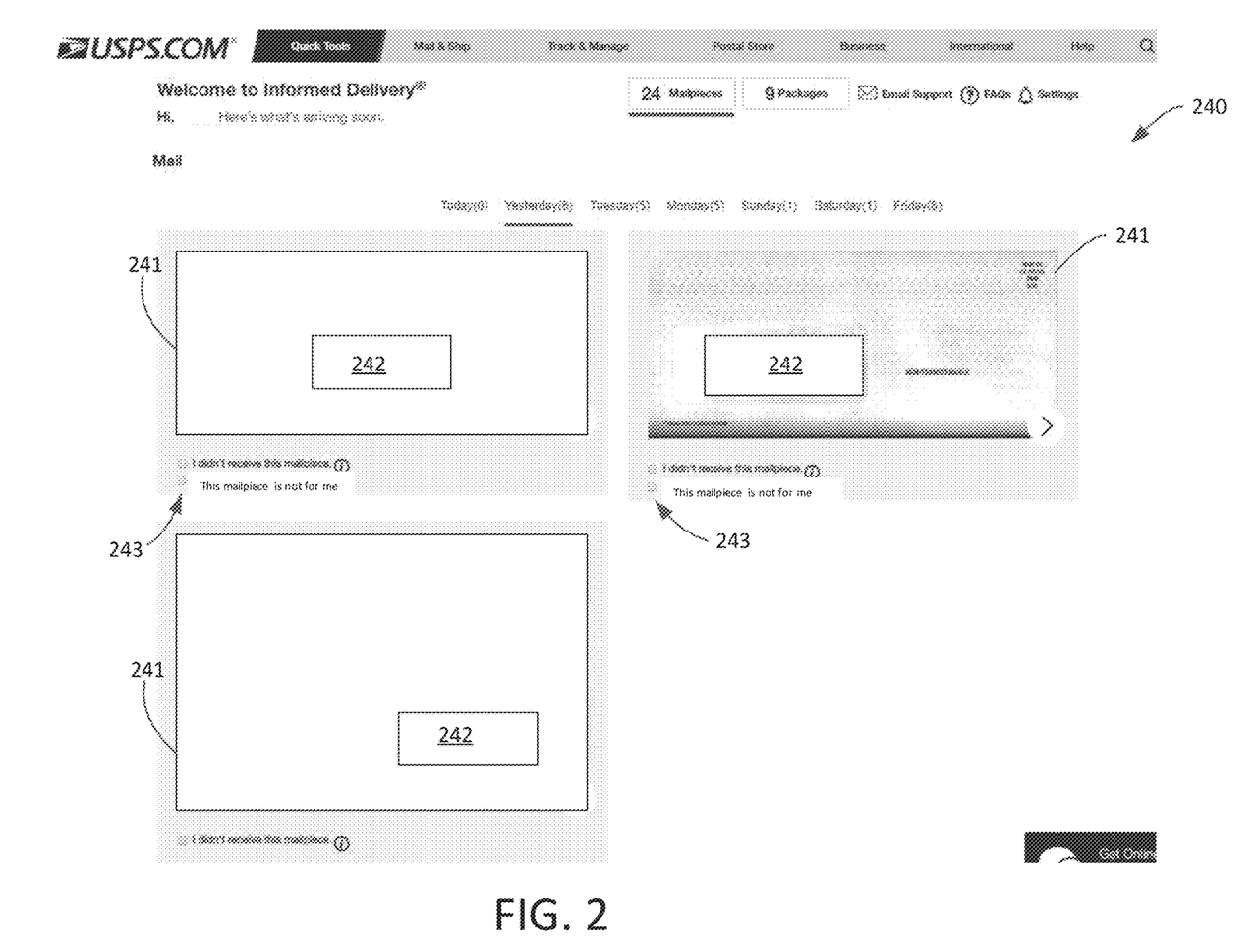
FIG. 2 depicts an exemplary display or screen of the user interface.

FIG. 2 depicts an exemplary display or screen of a user interface. A user interface 240 can be accessed via a website, a mobile application, a terminal, a computer workstation, or via other desired computer or electronic connection. The user interface 240 can be in communication with the server 101 similar to the user interface 140 described herein. The user interface 240 shows an exemplary dashboard type interface for the United States Postal Service (USPS). The user interface can display images 241 of items, such as mailpieces, which are to be delivered to a delivery point for a certain day. A user can access the user interface 240 by registering for an account and providing log-in credentials. The login and/or credentials will associate the recipient/user with a delivery point. A user that logs in can see the images 241 of the mailpieces for delivery. The images 241 can be images of actual mailpieces collected by the item processing equipment 170 and/or obtained from or stored in the operations database 120. In some embodiments, the images are digital representations of the actual mailpieces which have been provided by the sender of the item via the item sender system 160 or by another system.

A user can see the recipient name in the address field 242 of the images 241. The address field will show the name placed on the mailpiece by the item sender and the address of the delivery point. If a user identifies that the address field 242 shows a name other than the user's name, the name of an individual, business, or other entity the user knows does not receive items at the delivery point, or of an entity that does not live or work at the delivery point, has moved, etc., the user can select an option 243. The options 243 can indicate that the mailpiece is not for the user. The options 243 can also state that the addressee is wrong, the person moved, etc. In some embodiments, the user can select an option 243 regarding improper recipient in the address field 242, which can open a secondary menu with options for a user to input why the address field 242 contains incorrect information, such as the person has moved, the person does not live at the residence, the address is listed wrong, or any other error. In some embodiments, the user can input a correct address for the listed recipient, if known.

The information input by the user through selecting an option 243 can be provided to the item visibility system 150, which can then subsequently be relayed to the item sender system 160 by the server 101.

In some embodiments, the user interface 240 can request any additional secondary information in order to make the address more correct. For example, if the address seen in the address field is missing a unit number, a suite number, a floor number, has a misspelling, or contains another error, the user interface 240 can request updated or correct information from the user.

In some embodiments, the user interface has an option 243 which includes delivery instructions. When a user sees an image of an item for delivery, but the user does not wish the item to be left on the porch, or the user is not going to be available to sign for the item, or any other condition, the user can input these instructions. For example, the user can request, via the user interface 240, that the item be delivered to a side door, a back porch, or that the item be left in a secure receptacle on the porch. In some embodiments, the user can request that the item be delivered to another location in the area, such as at a neighbor's or family member's house. The server 101 can take the delivery instruction information and transmit the information via the operations database 120 to a mobile delivery device (not shown) of the carrier who will be delivering the item. The mobile delivery device can provide the instructions from the user. The instructions can include a combination for a secure receptacle on the porch, a request to hold the item or deliver another day, put the item in a different location, such as a parcel locker, or any other request provided by the user via the user interface 240.

Figure 3:
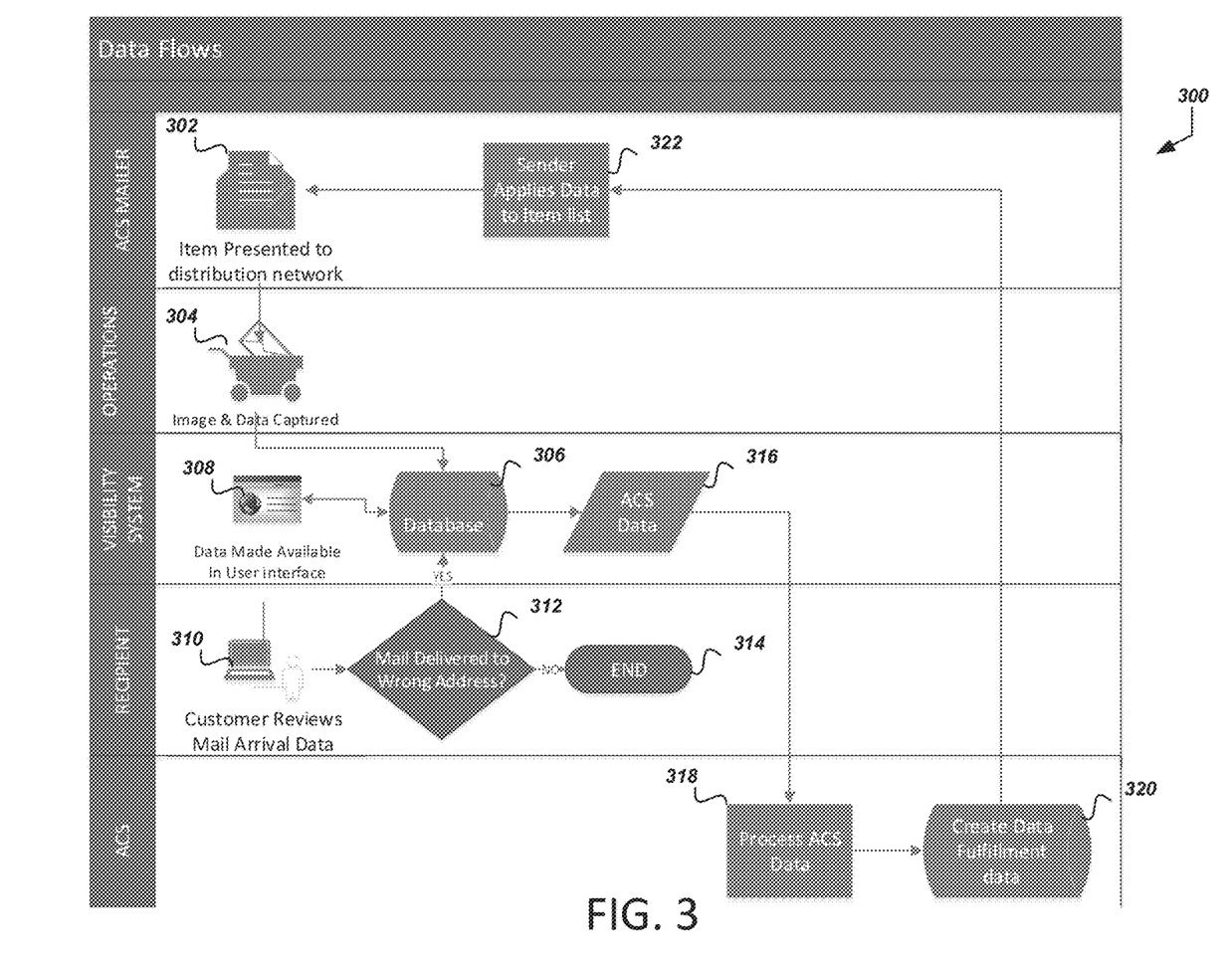
FIG. 3 depicts exemplary data flows in a process for identifying incorrect items.

FIG. 3 depicts exemplary data flows in a process for identifying incorrect items. The process 300 starts in a step 302, wherein an item or plurality of items are presented to the distribution network. The item or plurality of items can be presented to the distribution network by a mailer or other sending entity by dropping the items at a distribution facility or by having a resource pick-up the items from the mailer or sending entity. The items are then inducted into the distribution network. The mailer or sending entity can provide an electronic manifest of items to be delivered. The electronic manifest can include recipients and delivery points for the items, item information such as size, weight, payment, etc., as well as a digital representation of the items, as desired. When the item is inducted, an electronic item record is created and stored in the operations database 120 and any other desired location in the system 100. In some embodiments, the electronic item record may be provided to the distribution network by the mailer or sender prior to or concurrently with the presenting of the items to the distribution network, via, for example, a manifest, an API, and/or the like. The items can have codes or computer readable identifiers thereon which are associated with and/or stored in the electronic item record.

Process 300 moves to step 304, wherein the items are processed on item processing equipment 170. Processing the items can include generating processing and tracking information, and generating images of the items being processed as the items are processed, sorted, and transported in the distribution network. Item processing information including recipient, delivery point, item processing equipment identifiers, locations, computer readable identifiers, and other information is captured and/or created and stored in the electronic item record.

The process 300 moves to step 306, wherein the processing information, including the images of the items, is stored. Information generated from the item processing equipment is provided to and/or stored in the operations database 120.

The process 300 moves to step 308, wherein the operations database 120 and/or the server 101 make the item information, including item images, available via the user interface. The item information is sent to the user whose account information is associated with the delivery point for the item.

The process 300 moves to step 310, wherein the user accesses the interface 140, receives an email, text, or other alert, or otherwise accesses and/or views the image of the item and delivery information. The user can determine whether the item is correctly addressed, whether there is an incorrect recipient, whether the item is routed incorrectly, and the like. The user can provide this information via the user interface 140, as described elsewhere herein.

The process 300 receives, in decision state 312, based on the user input, an indication that the item was delivered to the wrong address, has the wrong recipient, or if there is another error or issue. If there is no issue identified with the item, then the process 300 ends in step 314.

If an issue is identified with the item in decision state 312, then the process moves to step 316. The interface 140 provides information to the server 101 regarding the user input. The server 101 uses the information received via the user interface 140 to instruct the operations database 120 regarding the incorrect addressee or recipient. If the improper association between a recipient and a delivery point, such as an address, is identified in decision state 312, the server 101 can instruct the operations database 120 regarding future instances of the incorrect association between recipient and delivery point. In some embodiments, the operations system can flag items where the improper recipient is listed, can reroute the items to a separate location for further processing, can return the items to the sender, and the like. The information regarding the incorrect recipient or other issue is transmitted to the operations database 120 and stored in the electronic item record for the item.

In step 316 the server 101 provides the notification or information regarding the incorrect recipient, address, issue, etc., received via the user interface 140, to the item sender system 160 and to item processing equipment 170 (not shown in FIG. 3). The process 300 can move to step 318, wherein the server 101 checks an address change database to determine if an address change request has been received for the recipient which was flagged by the user. For example, if the user interface 140 receives indication that the item included the incorrect recipient for the delivery point, the server 101 can access the delivery point database 130 to determine whether any address change requests exist for the recipient identified as being incorrect. If there is an address change request, the server 101 can identify what the updated delivery point should be for the listed recipient. For example the user may provide the incorrect recipient name in the user interface 140. The server 101 can determine whether the recipient name is associated with a COA request, a known address, etc.

The process moves to step 320, wherein the server 101 sends updated delivery point information the item sender system 160. The process 300 then can move to step 322, wherein the item sender system 160 can ingest the information and update its records of recipients and delivery points. The item sender can then send another plurality of items using updated delivery point information, and the process 300 can repeat.

In some embodiments, where the determination is made in decision state 312 that no error exists in the address information, the server 101 can store information for use in identity verification. The server 101 can access information from the item visibility system 150 regarding the type of item being sent which was not indicated to be incorrect. If the item is from a certain class of mail, such as first class mail, parcels, etc., then the server 101 can provide information to the delivery point database 130 providing evidence that the recipient listed on an item actually does live at or is associated with the delivery point on the item. If the item is a bulk mail item, every door direct mail, or another class, the server 101 will not provide the information as evidence of that the resident does live at or is associated with the delivery point.

Figure 4:
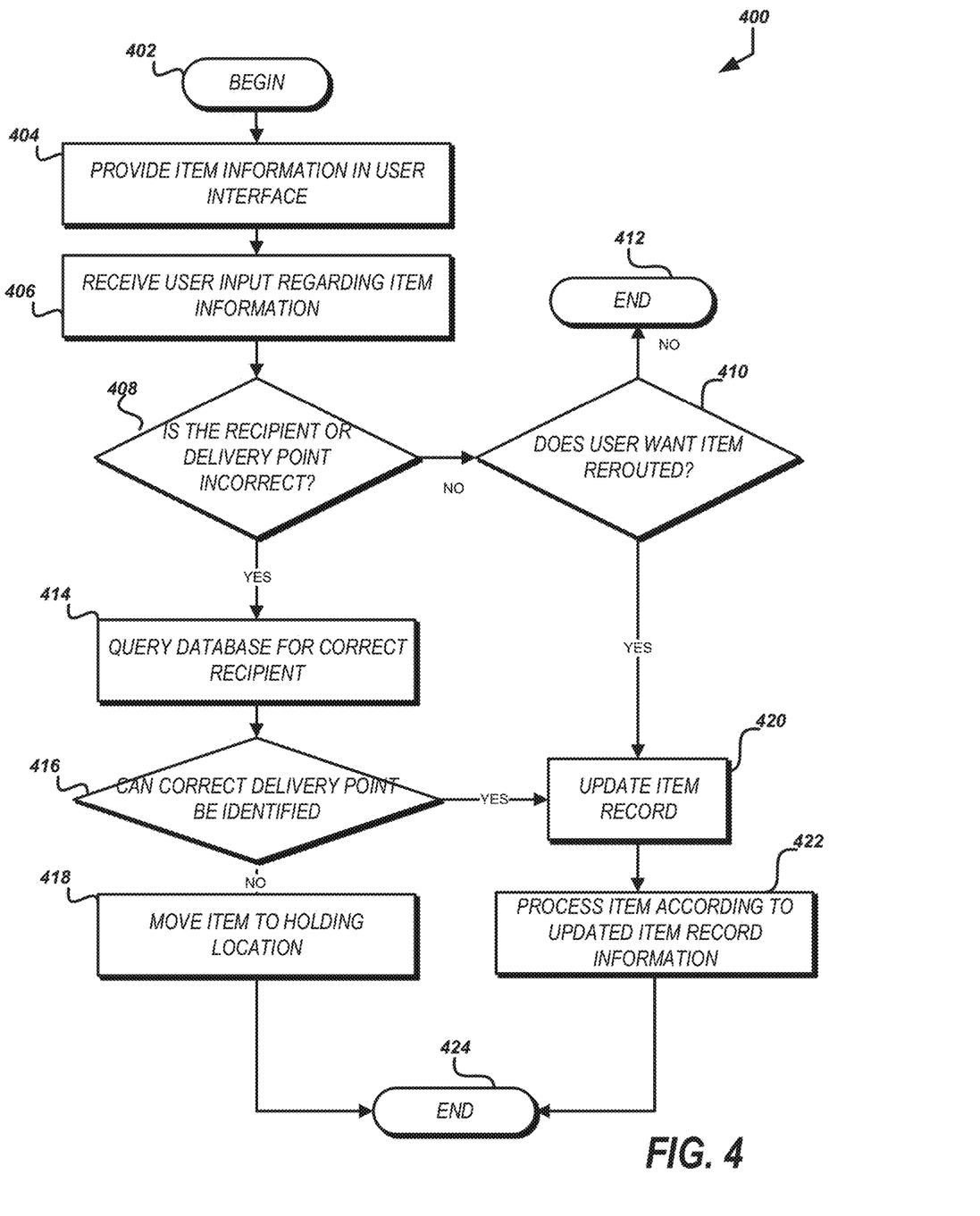
FIG. 4 is a flow chart of an exemplary method for processing an item in a distribution network based on input from a user.

FIG. 4 depicts a process for routing or re-routing an item in response to user input. A process 400 begins in step 402. The process 400 moves to step 404, wherein the server provides, via the user interface 140, item information for items intended for delivery to a delivery point. The user is presented with images of the items intended for delivery to the delivery point on the day of intended delivery, or on a day prior to the day of intended delivery. The user interface can also provide the user with options for providing input on the item information, such as that described with regard to FIG. 2.

The process 400 moves to step 406, wherein the user interface 140 receives input from the user regarding the item information provided in step 404. The user can input the information in the user interface 140, which can send the information to the server 101. This can occur, for example, where a user selects a radio button, inputting text in response to additional prompts, etc. For example, if the user input is that the recipient is incorrect, the user interface 140 can generate another set of options regarding the incorrect recipient, and can provide a field for inputting an address or additional information.

The process 400 moves to decision state 408, wherein the server 101 determines, based on the user input, whether the recipient of the item to be delivered is incorrect, or if the delivery point is incorrect. The recipient may not be correct if the delivery point corresponds to the residence of the user, but where the recipient name is not that of the user, or of any resident of the delivery point. If the recipient information is not incorrect, the process 400 moves to decision state 410, wherein the server 101 determines whether the user input indicates that the user would like the item rerouted or would like to somehow change the delivery. If the server 101 determines that the user does not want the item rerouted, the server 101 makes another determination or simply stores the user input for other processes. The process 400 ends in step 412.

If, in decision state 410, the user does want the item rerouted or the delivery somehow changed, the process 400 moves to step 420, wherein the electronic item record is updated. In requesting rerouting, the user may request the item be delivered to another delivery point, may request to increase the class of service and may pay the difference in postage, may request a change to the delivery time, or delivery instructions. The item record can be updated to associate a new delivery point with the item, to change the service class, to include updated delivery instructions, to delay delivery, or hold the mail.

Returning decision state 408, if the recipient of the item is incorrect, the process 400 moves to step 414, wherein the server 101 queries the delivery point database 130 to identify a correct recipient. The delivery point database 130 may contain COA requests. If a COA request exists for the incorrect recipient based on the recipient name, the item can be rerouted to the new address for the recipient.

Where the user indicates an error or incorrect recipient on an item, the server 101 can request item tracking information from the item visibility system 150 and operations information from the operations database 120, and recipient information, such as any address change information, from the delivery point database. The server 101 can identify the correct address or delivery point for the recipient listed on the item. The server 101 can identify from the item visibility system 150 and/or the operations database 120 where the incorrect item is within the distribution network. The server 101 can flag a record associated with the item and stored in the operations database and/or the item visibility system 150. The flag can also point to the updated or changed address for the recipient listed on the incorrect item. The item processing equipment can identify the item on a subsequent pass and can reroute the item for delivery to the updated or corrected address or delivery point. In some embodiments, the server 101 can instruct the operations database 120 and related systems to find the incorrect item and to process or sort the item out of the normal sort plan or normal course of operations.

In some embodiments, there may not be a COA request in the delivery point database 130. The server 101 can query the operations database, the item visibility system 150, and other databases with the incorrect recipient's name. The item visibility system 150 may have a record of the recipient name associated with a different delivery point from a prior delivery. If the prior delivery is a recent delivery, the server 101 can retrieve the delivery point associated with the recipient name on the prior delivery. In some embodiments, the server 101 may query outside databases, such as credit card companies, banks, cable/internet company databases, to identify information regarding the recipient name and a changed address for the recipient. Other queries may be performed and the server 101 may compile other information to make the determination regarding an item's correct delivery point. For example, the item visibility system 150 can contain more than one account having the same name. In this case, the server 101 can use the identity of the item being shipped, the sender, any mailer ID, or other information to identify the sender and identity of the item. The server 101 can then cross-reference the multiple accounts having the same name to identify whether the recipient has preferences associated with the sender or the type of item, whether the recipient has received an item from the particular sender in the past, etc. The server 101 may evaluate geographic information, including the location of the sender and the locations of the delivery points associated with multiple accounts, and can determine that it is more likely that an individual living close to the location of the sender is more likely to be the correct recipient. Not all possibilities are described herein; those described here are exemplary only.

The process moves to decision state 416, wherein it is determined if a correct delivery point can be found for the named intended recipient. If no correct delivery point can be identified, the process 400 moves to step 418, wherein the server 101 instructs the item processing equipment and/or other delivery resources, to move the item to a holding location to await further instructions or information.

The process 400 moves to step 424 and ends.

Returning to decision state 416, the process moves to step 420, wherein the item record information is updated to include the correct delivery point for the recipient, as described above.

The process 400 moves to step 422, wherein the item processing equipment processes the item according to the updated item record. If the user desires a changed delivery point, when the item is scanned or processed on the item processing equipment 170, the item processing equipment can identify the item as having updated instructions, and when the item is scanned, the server 101, or a processor in the item processing equipment 170 directs the item to be sorted, moved, processed, etc., according to the new delivery point, class of service, etc. The item processing equipment 170 can scan an identifier, such as a barcode on the item, query the item record, and received the updated routing instructions. In some embodiments, there may not be an identifier on the item. In this case, the item processing equipment may image the item, identify the address and delivery point associated therewith. The server 101 may then query the operations database 120 to identify the same or similar image in the database, and then retrieve the updated processing and delivery information from the item record for that item.

In some embodiments, the item processing equipment 170 may spray or print an identifier on to the item that is associated with the updated delivery point, class of service, etc.

In some embodiments, when information is received from the user regarding an incorrect delivery point or a change in delivery point, the server 101 can query the item visibility system 150 to identify a current location of the item, and an intended next location for the item. The server 101 can instruct the item processing equipment 170 regarding the item and its updated instructions, and can direct the item processing equipment 170 to process the item in accordance with the updated instructions. In some embodiments, if the item has been sorted to the unit delivery facility, the server 101 can provide an alert to operations personnel regarding the update via a mobile computing device with instructions to locate the item and to reroute it. For example, if the item was to be delivered on the day the instructions are received, the personnel at the unit delivery facility may hold the item at the unit delivery facility and will not send the item out for delivery. The server 101 may cause printing of an updated label to be applied to the item with the updated delivery information thereon.

If the item is out for delivery with a delivery resource, such as a carrier, when the user input is received, the server 101 can identify in the item visibility system 150, a mobile computing device associated with the delivery resource, and can send an alert to the delivery resource. The alert can come in the form of a pop-up message regarding the item. In some embodiments, a robotic sorting device on the vehicle can receive the item information, identify the location of the item in the vehicle, and can move the item from its location to a holding area or holding location within the vehicle so the item is not delivered. In some embodiments, when a carrier scans an item at delivery, the mobile computing device with which the item is scanned can provide an alert instructing the carrier to return the item to the unit delivery facility for re-routing. In some embodiments, a label may be printed and placed on the item at that time, or the label can be printed at the unit delivery facility and can await return of the item.

Processing the item according to the updated information can also be done by sending a signal to item processing equipment in one or more facilities where the item is or will be moved to, and/or by alerting a supervisor or other personnel regarding the incorrect item.

The item processing equipment can spray the corrected, updated, or new address on the item, or can attach a label, or the like to indicate the updated delivery point for the item. The item can then be associated with the recipient at the new address, and the item can be correctly delivered.

In some embodiments, a user's account can be associated with a delivery point, and the user sees mail delivered to the delivery point the user provided when registering an account. If the user moves, the user may still see a mailpiece intended for delivery to the user, but to the incorrect address. Via the user interface 140 the user can indicate that the user has moved, and can provide the updated address in the user interface 140. In this case, the processes described herein can be used to move the item to the updated delivery point of the user. The server 101 can update the delivery point database 130 with the recipient and the new address. The processes above may occur in order to reroute the item to the new address. The server 101 can also store the update to the user's address in an address change system (ACS) and can send updated address information to mailers or item senders who use the ACS.

If a user updates his address via the user interface, the item visibility system can also identify that the user no longer lives at the original address, and can update its records to no longer send images of items intended for the delivery point with which the user is no longer associated.

The present disclosure refers to processor-implemented steps for processing information in the system. Instructions can be implemented in software, firmware or hardware and include any type of programmed step undertaken by components of the system.

The one or more processors may be implemented with any combination of microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The central hub 120 may comprise a processor such as, for example, a microprocessor, such as a Pentium® processor, a Pentium® Pro processor, a 8051 processor, a MIPS® processor, a Power PC® processor, an Alpha® processor, a microcontroller, an Intel CORE i7®, i5®, or i3® processor, an AMD Phenom®, A-series®, or FX® processor, or the like. The processor 111 typically has address lines, data lines, and one or more control lines.

The system may be used in connection with various operating systems such as Linux®, UNIX®, MacOS®, or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Memory Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention.

What is claimed is:

1. A method for processing items in a distribution network, the method comprising:
   providing, via an interface, information for a physical item in transit to an intended delivery point, wherein the information comprises:
      a digital image of the physical item;
      an intended recipient name; and
      the intended delivery point;
   receiving, by one or more processors, via the interface, an indication that the intended recipient name is not associated with the intended delivery point, wherein the indication is based at least in part on the digital image of the physical item;
   in response to receiving the indication, setting, by the one or more processors, a flag in a memory, wherein the flag indicates the intended recipient name is not associated with the intended delivery point;

in response to setting the flag, determining, by the one or more processors, a correct delivery point for the intended recipient name;

in response to determining the correct delivery point for the intended recipient name, updating, by the one or more processors, in the memory, the correct delivery point for the intended recipient name;

querying, by the one or more processors, in an item visibility system to identify a current location of the physical item, wherein the item visibility system is configured to track the current location of the physical item while in transit;

identifying, by the one or more processors, a next piece of item processing equipment in the distribution network to process the physical item, based on the identified current location of the physical item;

scanning, in the identified next piece of item processing equipment, the physical item;

identifying the set flag for the physical item; and in response to identifying the set flag, automatically sending, to the identified next piece of item processing equipment, instructions to the identified next piece of item processing equipment to process the physical item according to the updated correct delivery point; and attaching, to the physical item, a label having the intended recipient name and the updated correct delivery point thereon.

2. The method of claim 1, wherein determining the updated correct delivery point for the intended recipient name comprises querying, by the one or more processors, a database for previously delivered items having the intended recipient name associated therewith.

3. The method of claim 2, wherein determining the updated correct delivery point for the intended recipient name further comprises identifying, by the one or more processors, a sender of the physical item or a type of the physical item and querying, by the one or more processors, the database for an association between the previously delivered items and the intended recipient name.

4. The method of claim 1, wherein the identified next piece of item processing equipment is a mobile delivery device, and wherein the instructions comprise a notification to a carrier to transport the physical item to a delivery facility.

5. The method of claim 1, wherein, if the correct delivery point cannot be determined, the method further comprises:
updating an item record to indicate that no delivery point is identified;
instructing the item processing equipment that no delivery point is identified; and
moving, in the item processing equipment, the physical item to a holding location.

6. A system for processing items in a distribution network, the system comprising:
an interface configured to:
provide information for a physical item in transit, wherein the information comprises:
a digital image of the physical item;
an intended recipient name; and
an intended delivery point of the physical item; and
receive an indication that the intended recipient name is not associated with the intended delivery point, wherein the indication is based at least in part on the digital image of the physical item; and one or more processors configured to:
receive, from the interface, the indication that the intended recipient name is not associated with the intended delivery point;
in response to receiving the indication, set a flag in memory, wherein the flag indicates the intended recipient name is not associated with the intended delivery point;
in response to setting the flag, determine a correct delivery point for the intended recipient name;
in response to determining the correct delivery point for the intended recipient name, update, in the memory, the correct delivery point for the intended recipient name;
query an item visibility system to identify a current location of the physical item, wherein the item visibility system is configured to track the current location of the physical item while in transit; and
identify a next piece of item processing equipment in the distribution network to process the physical item, based on the identified current location of the physical item,
automatically send instructions to the identified next piece of item processing equipment to process the physical item according to the updated correct delivery point; and
wherein the identified next piece of item processing equipment is configured to:
scan the physical item;
identify the set flag for the physical item;
in response to identifying the set flag for the physical item, automatically reroute, in the identified next piece of item processing equipment, the physical item to the updated correct delivery point; and
attach, to the physical item, a label having the intended recipient name and the updated correct delivery point thereon.

7. The system of claim 6, wherein the server is configured to determine the updated correct delivery point for the intended recipient name by querying, by the one or more processors, a database for previously delivered items having the intended recipient name associated therewith.

8. The system of claim 7, wherein the server is configured to determine the updated correct delivery point for the intended recipient name by identifying, by the one or more processors, a sender of the physical item or a type of the physical item and querying, by the one or more processors, the database for an association between the previously delivered items and the intended recipient name.

9. The system of claim 6, wherein the identified next piece of item processing equipment is a mobile delivery device, and wherein the instructions comprise a notification to a carrier to transport the physical item to a delivery facility.

10. The system of claim 6, wherein, if the correct delivery point cannot be determined, the one or more processors are further configured to:
update an item record to indicate that no delivery point is identified;
instruct the item processing equipment that no delivery point is identified; and
instruct the item processing equipment to move, in the item processing equipment, the physical item to a holding location.

* * * * *